(12) United States Patent
Ashworth et al.

(10) Patent No.: US 6,622,511 B2
(45) Date of Patent: Sep. 23, 2003

(54) FROZEN CONFECTIONERY MAKER

(75) Inventors: Steven Wallace Ashworth, Hong Kong (HK); Harjeet Singh, Hong Kong (HK)

(73) Assignee: Main Power Electrical Factory Ltd. (HK)

( * ) Notice: Subject to any disclaimer, the term of this patent is extended or adjusted under 35 U.S.C. 154(b) by 0 days.

(21) Appl. No.: 10/073,536

(22) Filed: Feb. 11, 2002

(65) Prior Publication Data

US 2003/0150235 A1 Aug. 14, 2003

(51) Int. Cl.[7] .................................................. A23G 9/12
(52) U.S. Cl. ....................................................... 62/343
(58) Field of Search .................................. 62/342, 343

(56) References Cited

U.S. PATENT DOCUMENTS 4,241,590 A * 12/1980 Martineau .................... 62/343
4,760,710 A * 8/1988 Takagi ......................... 62/354
4,796,440 A * 1/1989 Shiotani et al. .............. 62/343
5,016,446 A * 5/1991 Fiedler ......................... 62/342

* cited by examiner

Primary Examiner—William E. Tapolcai
(74) Attorney, Agent, or Firm—Jackson Walker L.L.P.

(57) ABSTRACT

A frozen confectionery maker includes a container having a cavity in its walls and base for receiving freezable solution. There is a lid for closing the container and a mixer rotatably engagable with the lid to locate within the container. A drive means receivable on the lid rotates the mixer. A fluid passage in juxtaposition the lid has at least a first opening proximate the mixer and a second opening at a dispensing spout. A valve is located within the fluid passage and has an operable position to close the passage. The mixer is adapted to deliver confectionery mixture in the container to the passage via the first opening. If the valve is in the operable position the mixture is returned to the container. If the valve is not in the operative position the mixture is dispensed at the spout.

7 Claims, 14 Drawing Sheets

FROZEN CONFECTIONERY MAKER

BACKGROUND TO THE INVENTION

1. Field of the Invention

The invention relates to frozen confectionery makers, and in particular to soft-serve ice cream makers.

2. Background Information

Frozen confectionery makers have been known since 1846 when the hand cranked freezer was invented by a woman named Nancy Johnson. A similar device was first patented in 1848 by a Mr young, who called his invention the "Johnson Patent Ice Cream Freezer".

Since that time a number of improvements had been made including the provision of electric driving motors, and self-dispensing systems. An example of a modern frozen confectionery maker is found in U.S. Pat. No. 4,736,600. This patent describes a motor driven self-dispensing frozen confectionery maker. The device comprises a closed mixing bowl pivotally mounted on a cradle. A paddle/auger assembly is provided for mixing the confectionery mixture. The confectionery mixture is mixed within the bowl and when ready to serve the bowl rotates, or tilts, within the cradle and the paddle/auger assembly reverses to dispense the frozen confectionery through a dispensing aperture.

One disadvantage of the above designed is that additional, and complex, components are required to achieve the rotation/tilt, and associated locking, function. This increases the manufacturing cost of the device.

A further disadvantage is that a mechanism is required; to control and change the direction of the paddle/auger. Again, this increase the manufacturing cost of the device.

SUMMARY OF THE INVENTION

It is an object of the present invention to overcome or ameliorate the above disadvantages or at least to provide the public with a useful alternative.

According to a first aspect of the invention there is provided a frozen confectionery maker including:

- a mixing container having a cavity in its walls and base for receiving freezable solution;
- a lid for closing the container;
- a mixer assembly in the container;
- a drive means to rotate the mixer;
- a fluid passage in juxtaposition the lid, the fluid passage having at least a first opening proximate the mixer and a second opening at a spout external the lid; and
- a valve located within the fluid passage and having an operable position to close the passage;

wherein the mixer is adapted to deliver confectionery mixture in the container to the passage via the first opening, the mixture returning to the container if the valve is in the operable position, or passing through the passage to the spout if the valve is not in the operable position.

According to a second aspect of the invention there is provided a frozen confectionery maker including:

- first and second container portions arranged to provide a container having a cavity in its walls and base for receiving freezable solution;
- a lid for closing the container;
- a mixer rotatably engagable with the lid so as to locate within the container;
- a drive means receivable on the lid so as to engage and rotate the mixer;
- a fluid passage in juxtaposition the lid, the fluid passage having at least a first opening proximate the mixer and a second opening at a spout external the lid; and
- a valve located within the fluid passage and having an operable position to close the passage;

wherein the mixer is adapted to deliver confectionery mixture in the container to the passage via the first opening, the mixture returning to the container if the valve is in the operable position, or passing through the passage to the spout if the valve is not in the operative position.

Preferably, the mixer includes:

- a first elongate screw portion having a first end adapted to rotatably engage the lid, the screw portion adapted to deliver confectionery mixture in the container to the passage, and
- a second paddle portion pivotally disposed proximate a second end the screw portion, the paddle portion adapted to direct confectionery mixture towards the screw portion.

Preferably, the lid has a skirt extending to provide a tube in which the mixer screw portion is received, the passage first opening located internal the proximal end of the skirt.

Preferably, the mixer further includes a third aerator portion extending helically from the paddle portion toward the lid.

Preferably, the third aerator portion is adapted to scrap the inner walls of the container.

Preferably, the fluid passage has a return opening wherein if the valve is in the operable position confectionery mixture is discharged from the return opening and if the valve is not in the operative position confectionery mixture is discharged from the spout.

Preferably, there are convoluted strips disposed within the wall and base cavity of the container to provide an increased surface area.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

The invention will now be described with reference to a soft-serve ice cream maker, however the invention can be used for other frozen confectionery makers.

Figure 1:
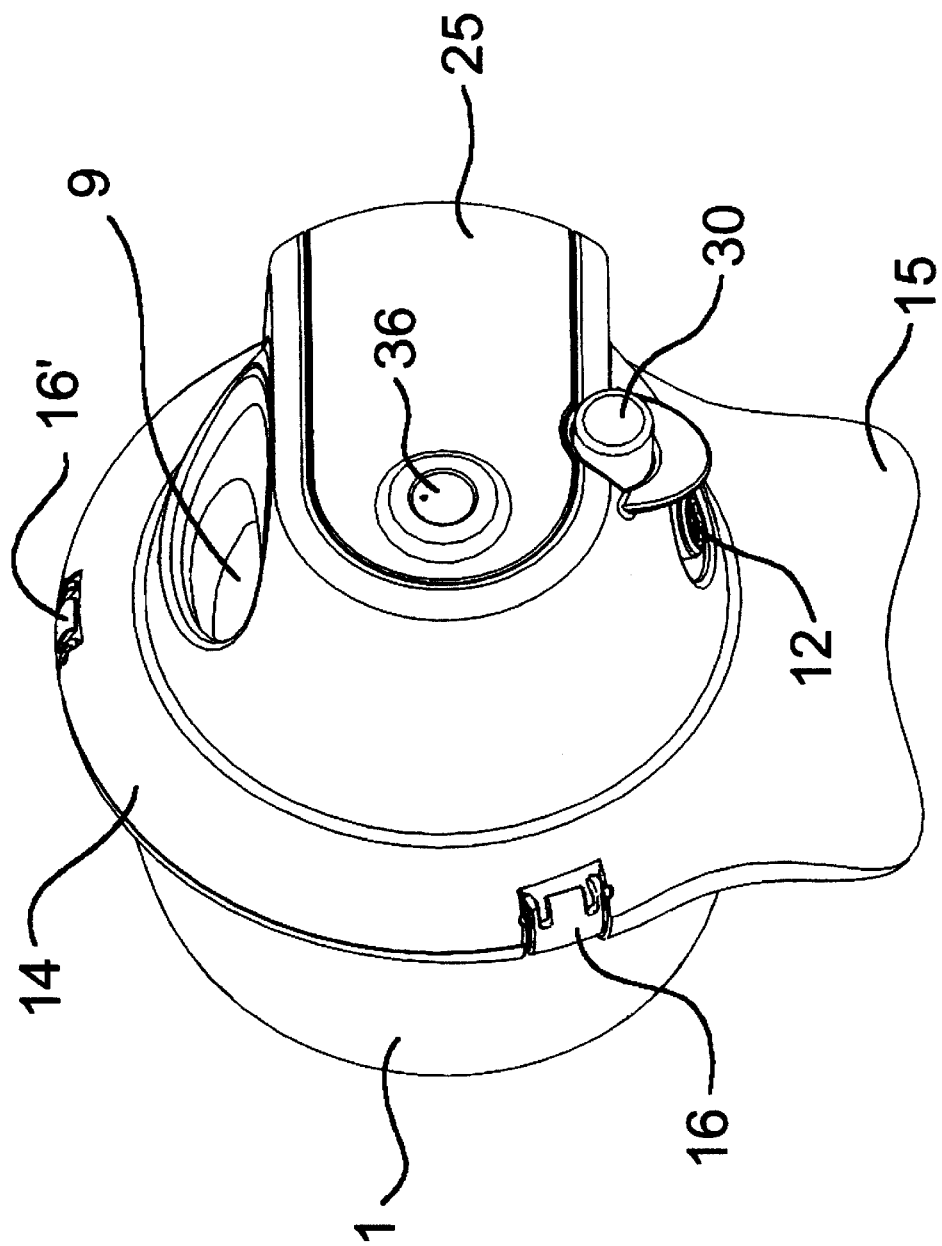
FIG. 1 illustrates a frozen confectionery maker according to the invention.

Referring to FIG. 1, thereshown is a frozen confectionery maker that sits at an inclined angle on a flat surface. The lower portion of the confectionery maker is supported by a mixing container portion 1, while the upper portion is supported in raised manner on a foot 15 extending radially from proximate the upper periphery of the container portion 1. A first aperture is provided for introducing a confectionery preparation into the confectionery maker. A motor 25 with on/off operating switch 36 is provided for turning a mixing/dispensing member 20 and a downwardly orientated dispensing spout 12 allows dispensing of the prepared confectionery.

Figure 2:
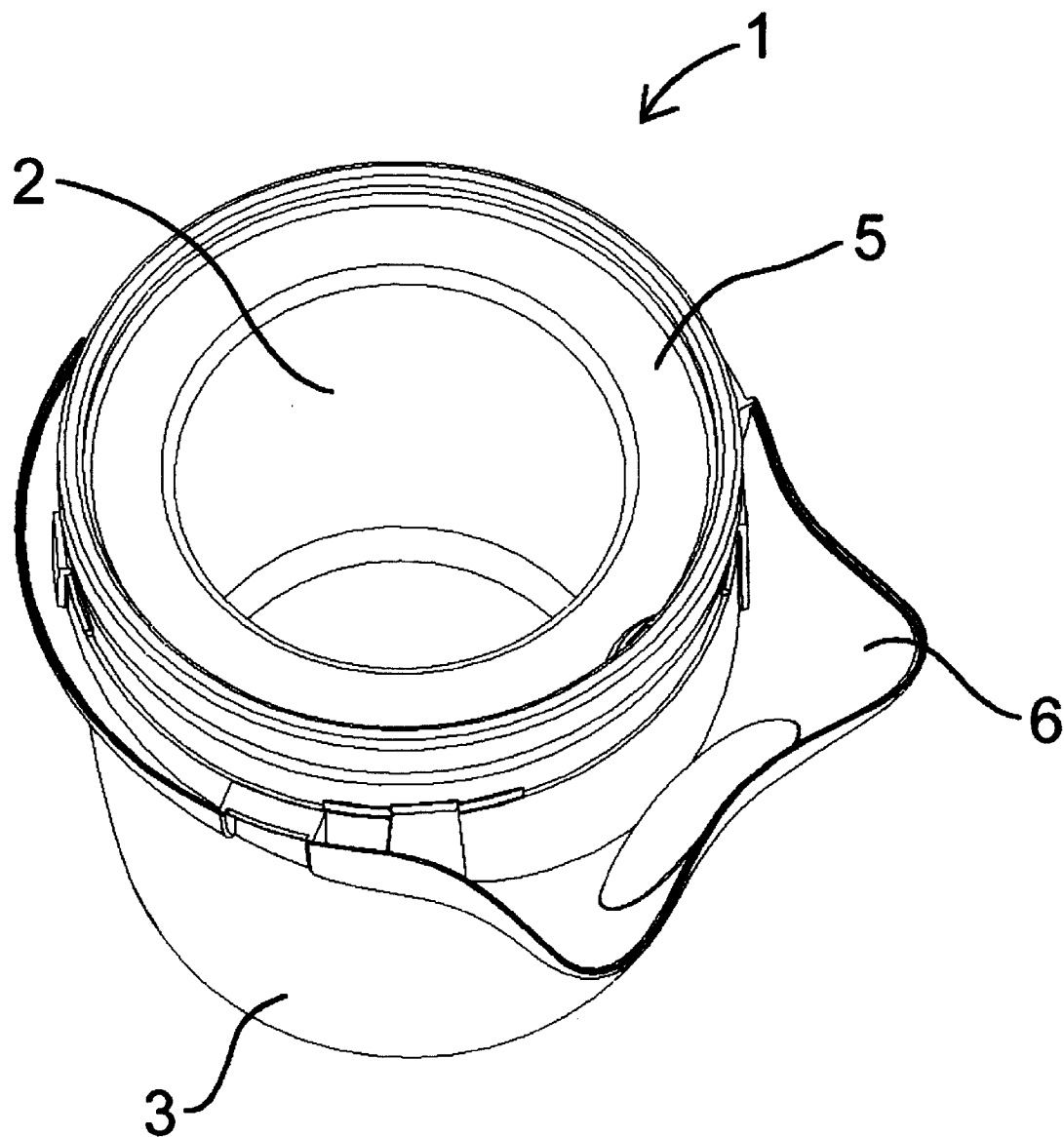
FIG. 2 illustrates a mixing container of the frozen confectionery maker.

Referring to FIG. 2, the mixing container 1 comprises an outer container portion 3 and an inner container portion 2. The inner portion 2 is removably received within the outer portion 3 so that container 1 is provided with a cavity in its walls and base. The two container portions 2, 3 can be separated so that a cooling solution, of known-type, can be introduced into the cavity. The cooling solution provides the means of reducing the temperature within the mixing container 1 to between −20° C. and −15° C.

Optionally, and not shown, the inner container portion 2 has convoluted strips attached to its outer surface. When the container 1 is assembled the convoluted strips are located within the wall and base cavity to provide an increased surface area exposed to the cooling solution. This increases the cooling efficiency within the mixing container 1.

Figure 3:
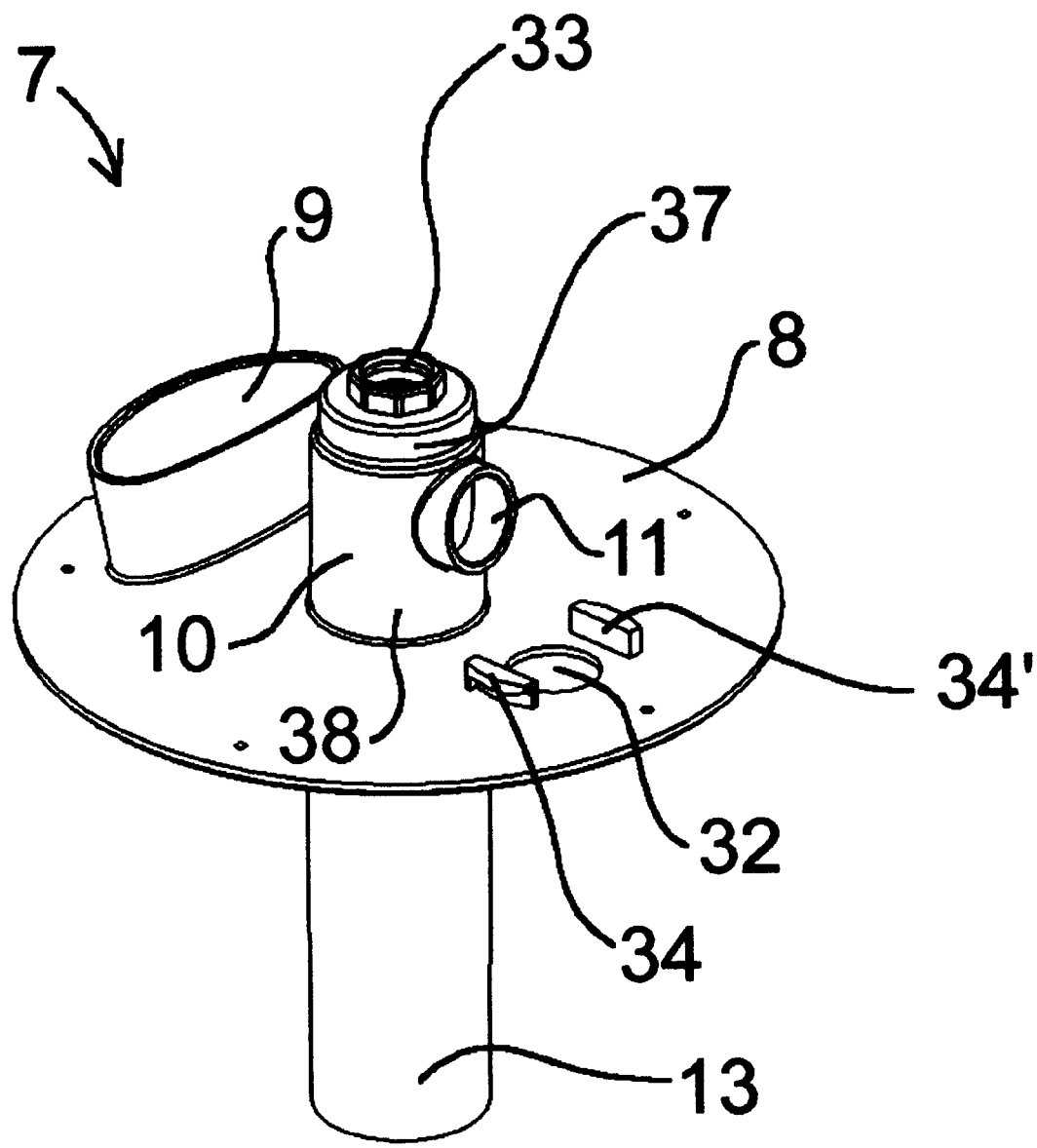
FIG. 3 illustrates a lid for the mixing container.

The container 1 has a wide upper rim 5 on which a sealing gasket (not shown) is removably located. The gasket provides a seal when a lid 7, as shown in FIG. 3, closes the container 1. The container 1 also has a first portion 6 of foot member 15 extending radially from its upper periphery.

Referring to FIG. 3, the lid 7 comprises a disk shape body member 8 design to fit the upper rim 5 and close the container 1. A number of apertures are provided in the lid. A first aperture 9 has a skirt extending upwardly from its periphery, and is provided to allow the introduction of confectionery mixture into the container 1 after the confectionery maker is assembled. The upper periphery of the skirt mates with a corresponding opening in a top cover 14 (described later) to define a passage from the top cover through to aperture 9.

Extending axially through body 8 is an elongate tubular member comprising and upper housing portion 10 and a lower screw tube portion 13 that is open at its distal end. Located at the top of housing portion 10 is a bearing housing 37 with aperture 33 for rotatably receiving a mixer device, as shown FIGS. 5a to 5C. The lower part of housing 10 is a fluid path having an opening 11.

Diametrically opposite aperture 9, and proximate fluid path opening 11, is a return opening 32 in body 8. Return opening 32 is located between two securing tabs 34.

Figure 4:
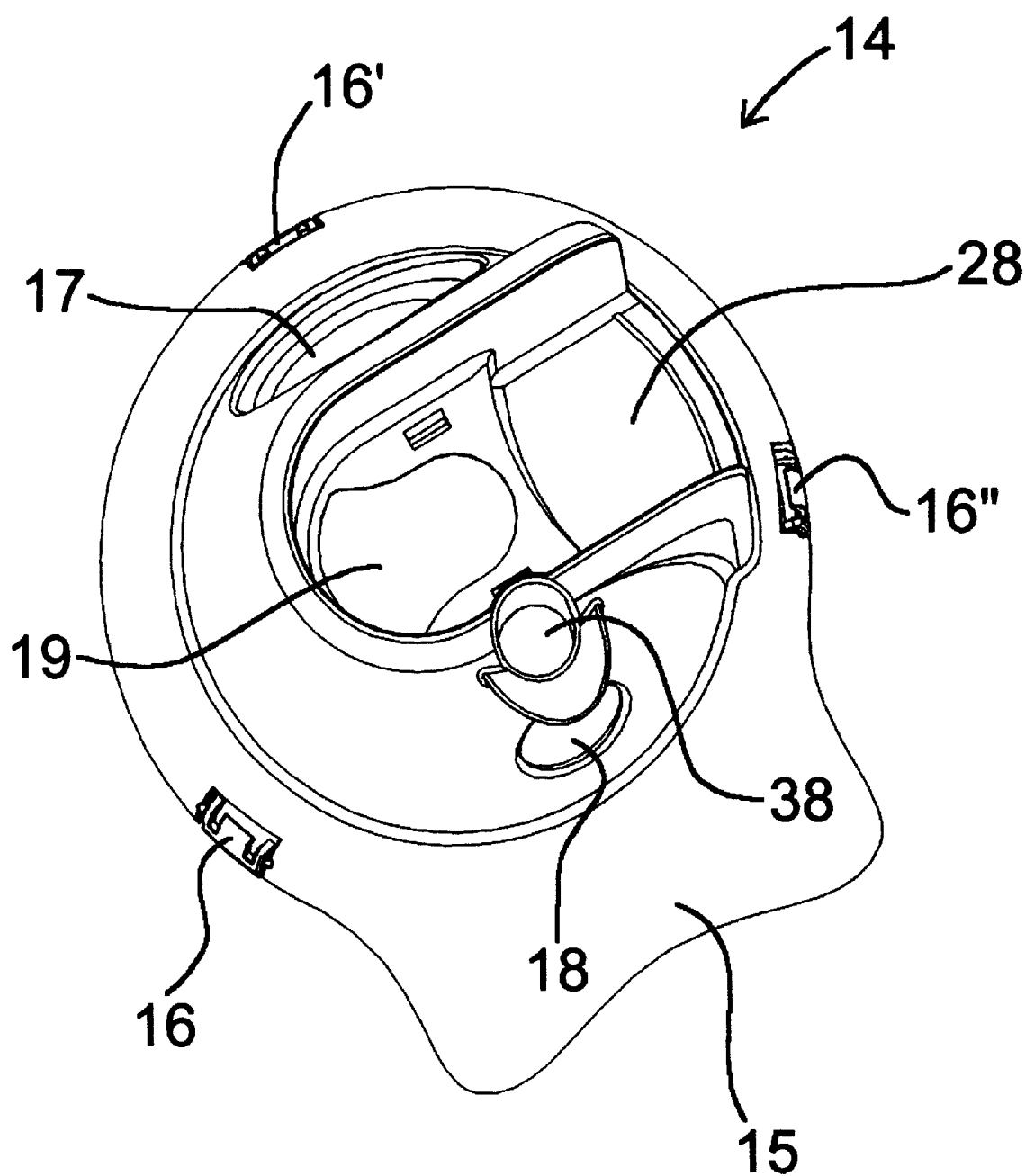
FIG. 4 illustrates a top cover for the lid and frozen confectionery maker.

Referring to FIG. 4, a top cover 14 has latches 16 to secure the top cover and the lid to the rim of mixing container 1. A first aperture 17 in top cover 14 is provided to mate with the upper periphery of aperture 9 skirt as previously described. A recessed portion 28 is provided to flushly receive the drive motor unit 25. Within recessed portion 28 is an opening 19 for receiving bearing housing 37. A dispensing spout opening 18 is provided for receiving a dispensing spout, and a valve control opening 38 is provided for receiving a valve control handle described later.

Figure 5A:
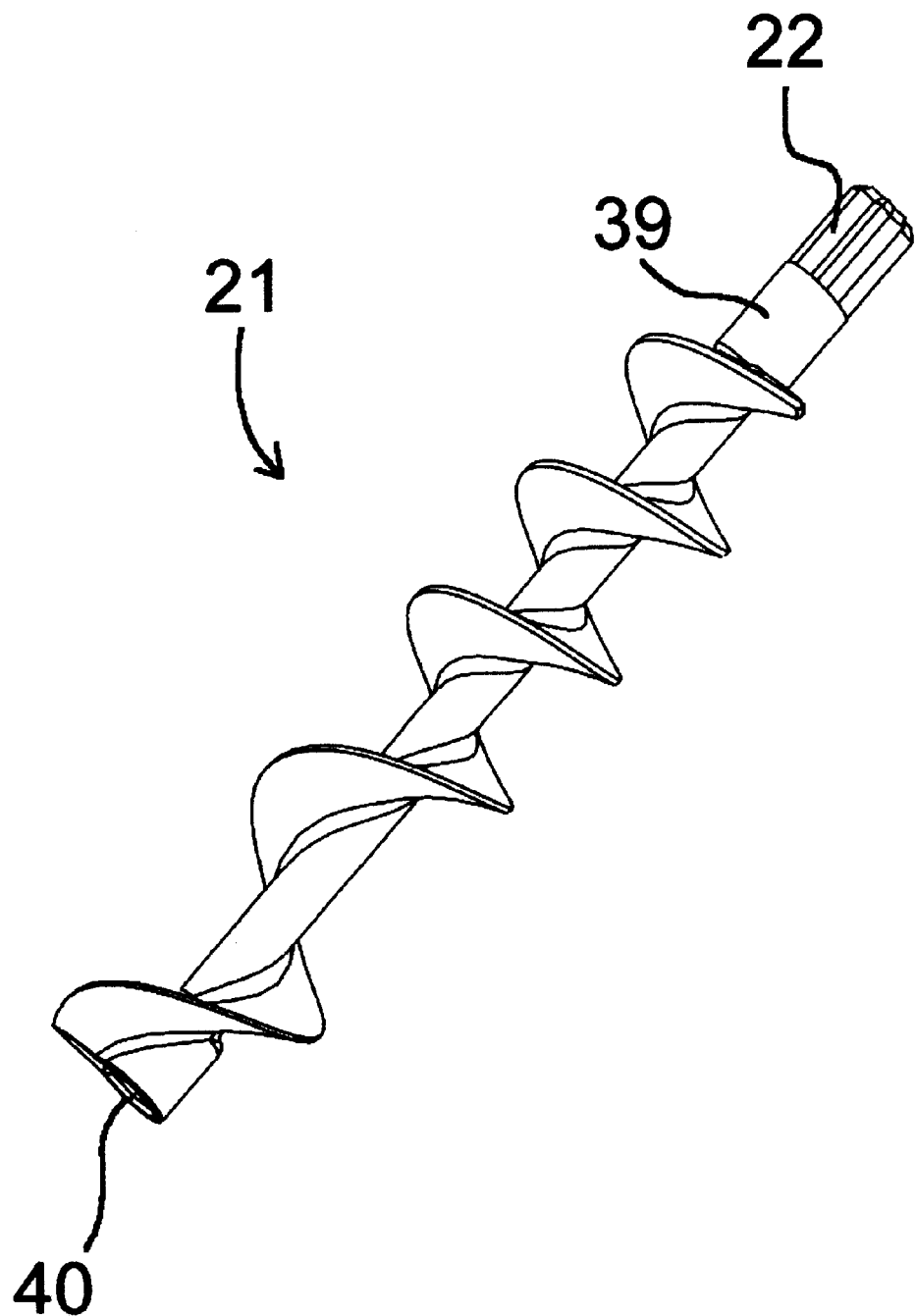
FIGS. 5a to 5c illustrate a mixer for the frozen confectionery maker.
Figure 5B:
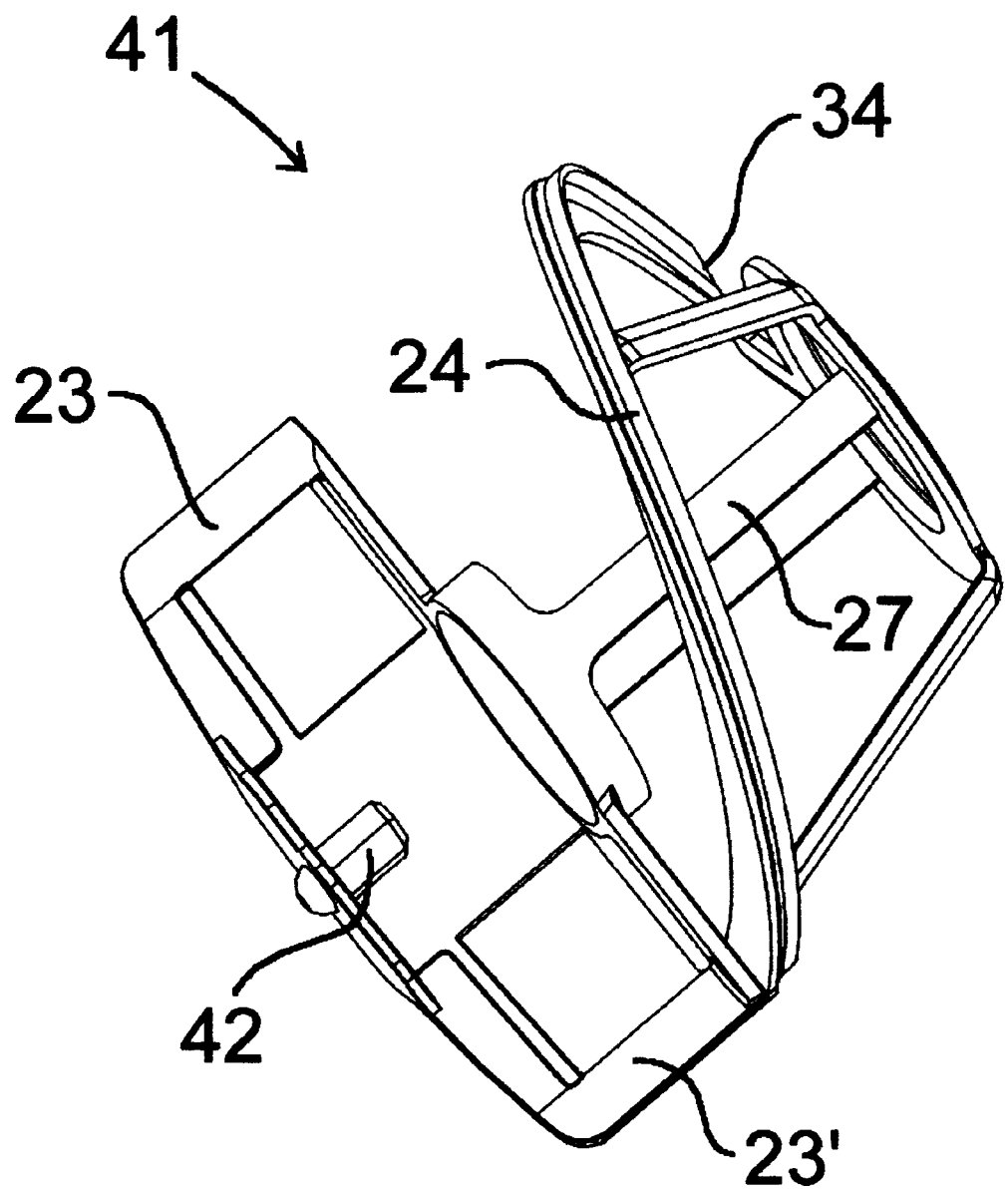
Figure 5C:
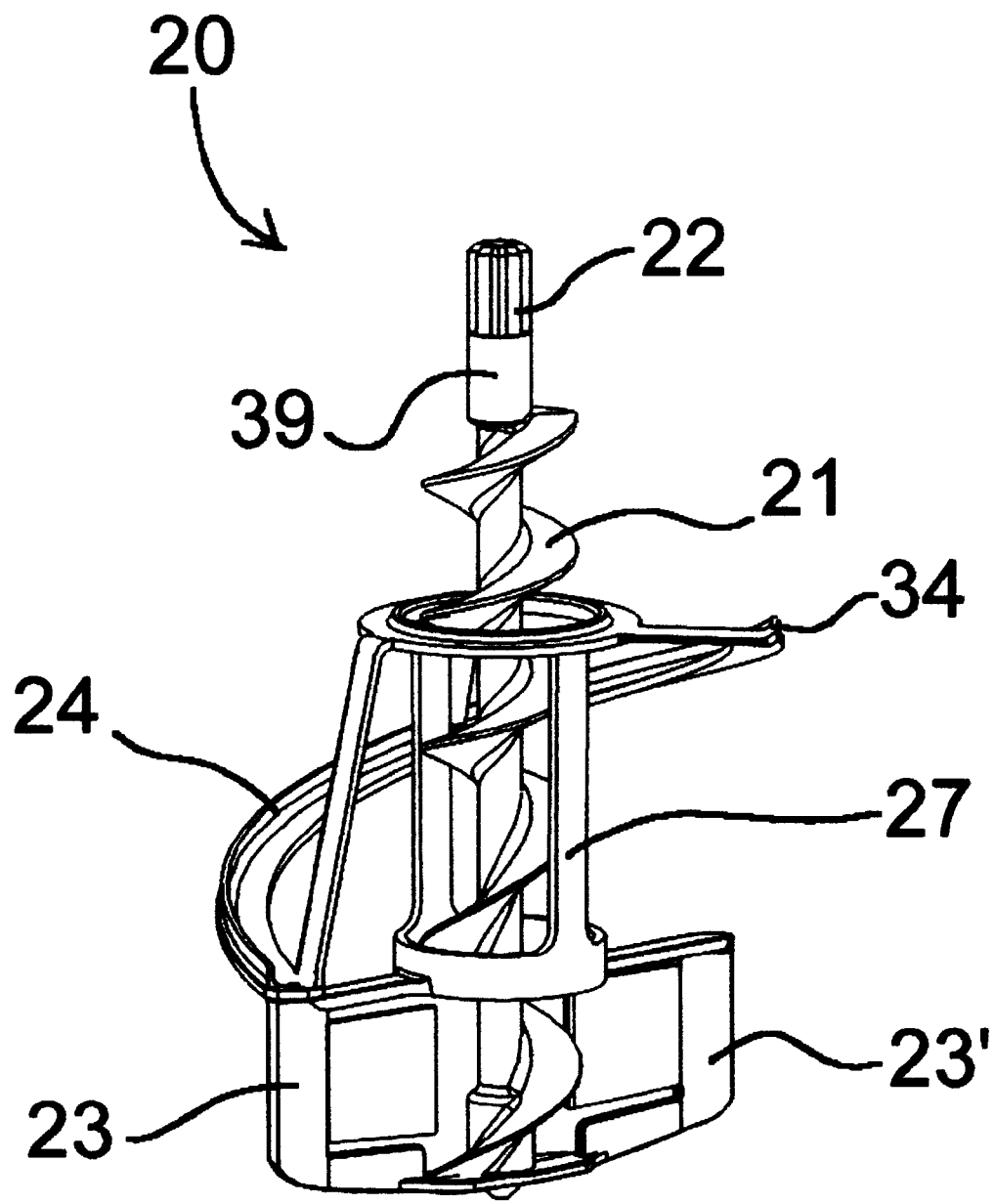

Referring to FIGS. 5a to 5c, a mixer 20 is rotatably engagable with the bearing housing 37 of lid 7 so as to be located within mixing container 1 when the confectionery maker is assembled. The mixer 20 provides the functions of mixing and aerating the confectionery mixture as it is cooled by the cooling solution, as well as dispensing the prepared frozen confectionery mixture from within mixing container 1. One uniqueness of the invention is that the mixer 20 can perform these tasks while turning in one direction only. There is no need to reverse the direction of rotation for the dispensing function.

Referring firstly to FIG. 5a, the mixer 20 comprises an elongated helical screw 21 which is received within screw tube 13. At the first end of the screw 21 are a shank 39 and drive spline 22. The shank 39 is received within the bearing housing 37 to rotatably mount the mixer 20. The drive spline 22 extends through aperture 33 in the bearing housing 37 so as to be engagable by the motor pack 25. Within the second end of screw 21 is a hexagonal shaped bore 40.

Referring now to FIG. 5b, a paddle and dasher member 41 has two diametrically opposed paddles 23, 23'. The paddles 23 extend radially from the longitudinal axis of paddle and dasher member 41, and are dimension to, in use, scrapingly engage the lower portion of the side and the base of the inner surface of mixer container 1.

Extending helically from the top of one of the paddles 23 is a dasher 24. The dasher 24 is also an aerator which aerates the mixture as it is mixed by the mixer 20. The dasher 24 has a wide diameter and is adapted to, in use, scrapingly engage the inner surface of the mixer container 1 wall as the mixer 20 rotates. The dasher 24 extends helically from the top of the paddle 23 to a position substantially two thirds the length of screw 21. A frame 27 supports the top 34 of dasher 24.

The lower edges of paddles 23 are joined by a plate having a hexagonal pin 42 extending axially with paddle and dasher member 41. The hexagonal pin 42 is dimensioned to fit within hexagonal bore 40 of screw 21.

Referring now to FIG. 5c, screw 21 is disposed with frame 27 of paddle and dasher member 41 so that hexagonal pin 42 is received within hexagonal bore 40. In use, the paddles 23 are adapted to scoop confectionery mixture within container 1 and deliver it to the second end of the screw 21.

Figure 6A:
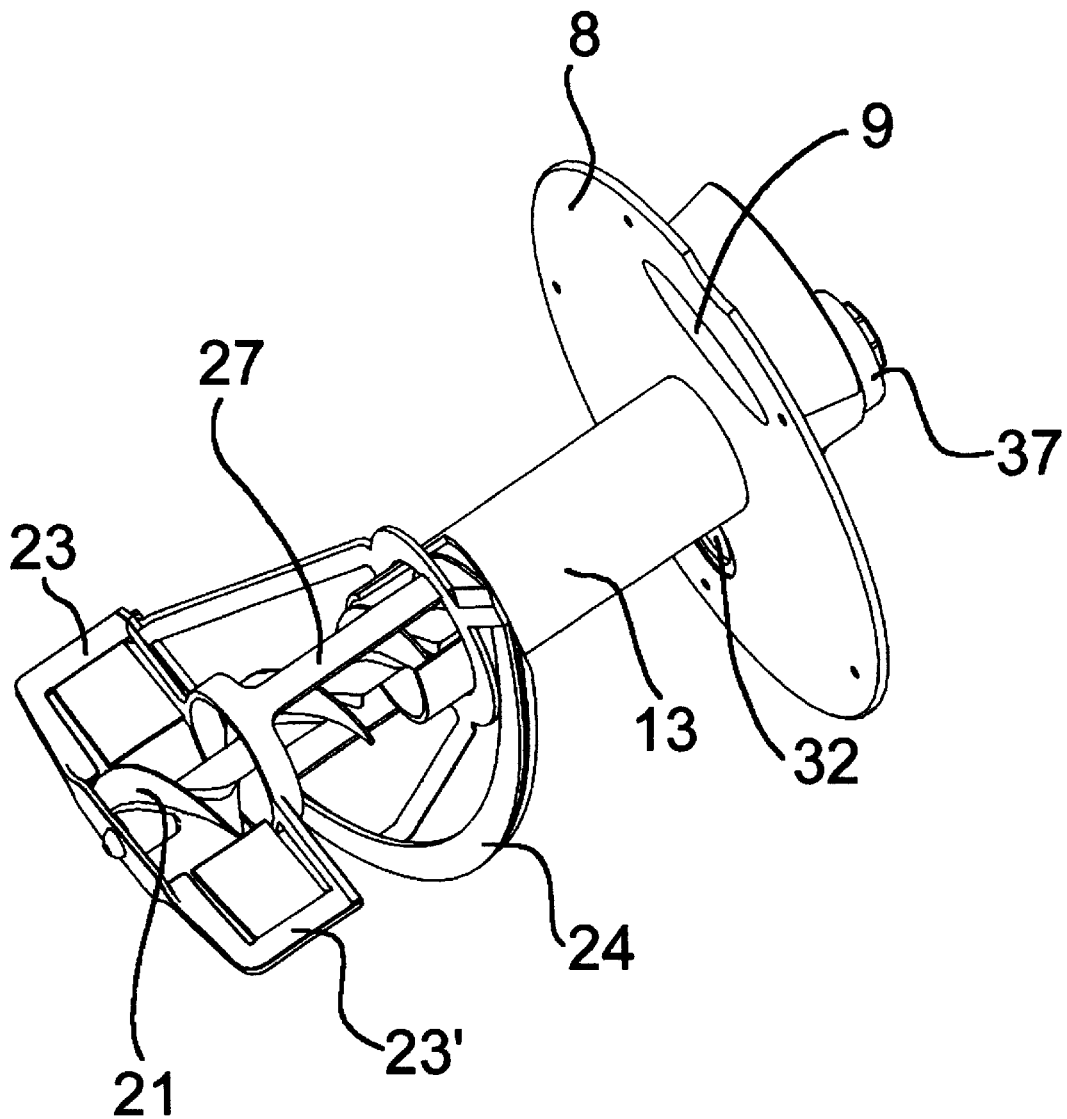
FIGS. 6a and 6b illustrate assembly of the mixer and lid.
Figure 6B:
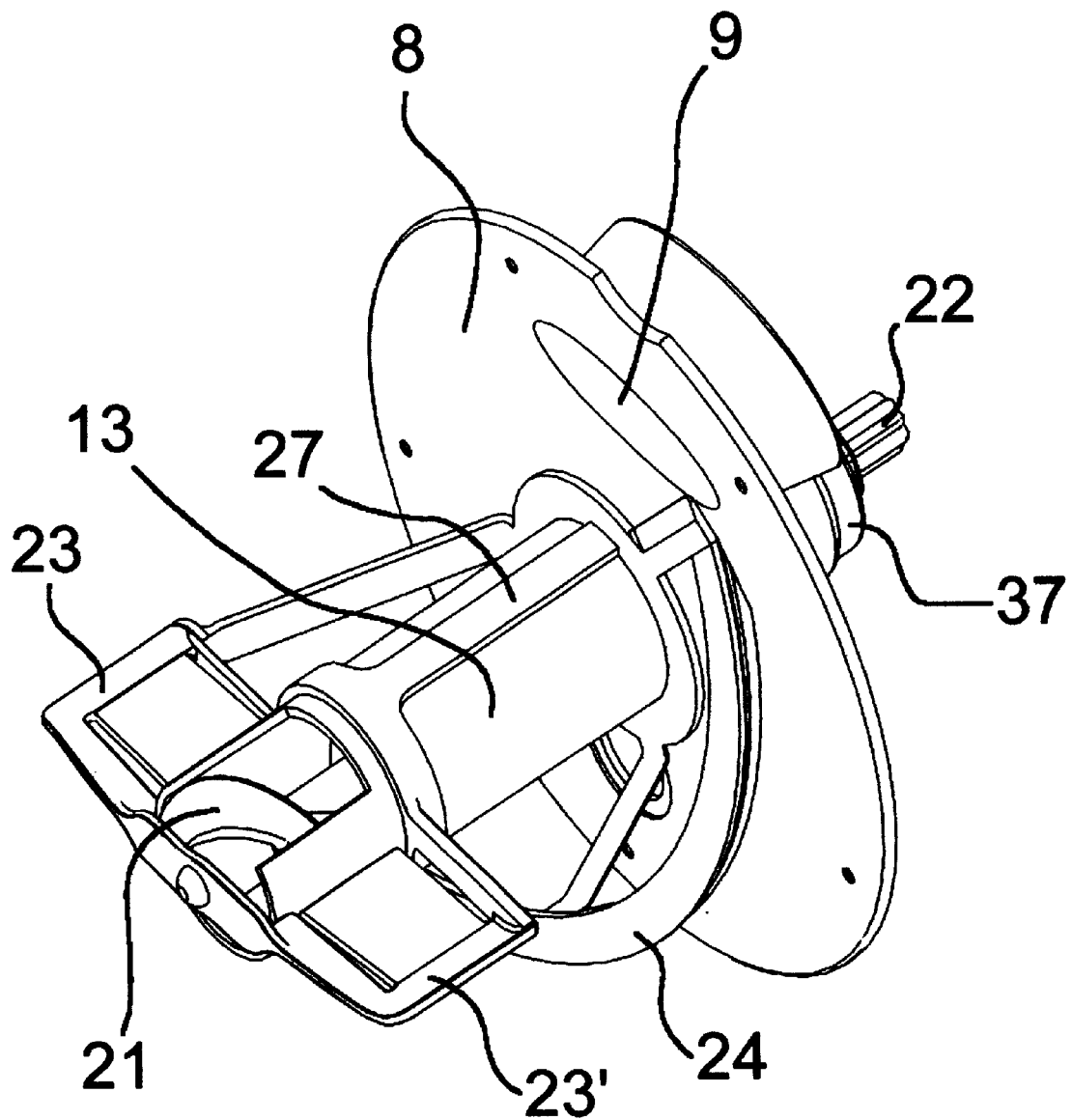

Referring to FIGS. 6a and 6b, the mixing assembly 20 rotatably engages with lid 7. The screw 21 is received within screw tube 13 extending from lid member 8. Frame 27 supporting dasher 24 locates external screw tube 13. Shank 39 is received within bearing housing 37 of lid 7.

Figure 7:
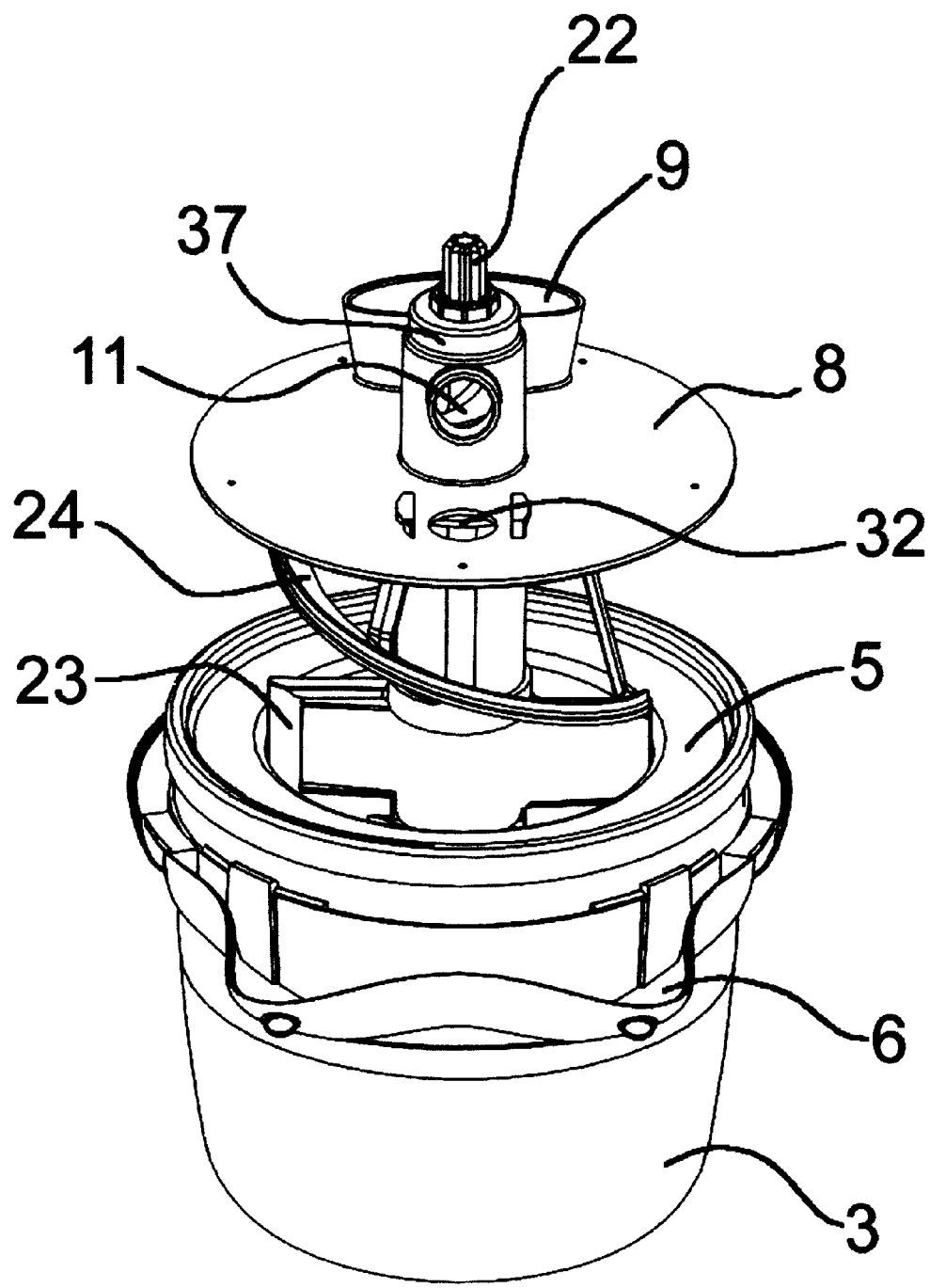
FIG. 7 illustrates assembly of the container and lid.

Referring to FIG. 7, when rotatably engaged the lid 7 and mixer 20 are position on container 1.

Figure 8:
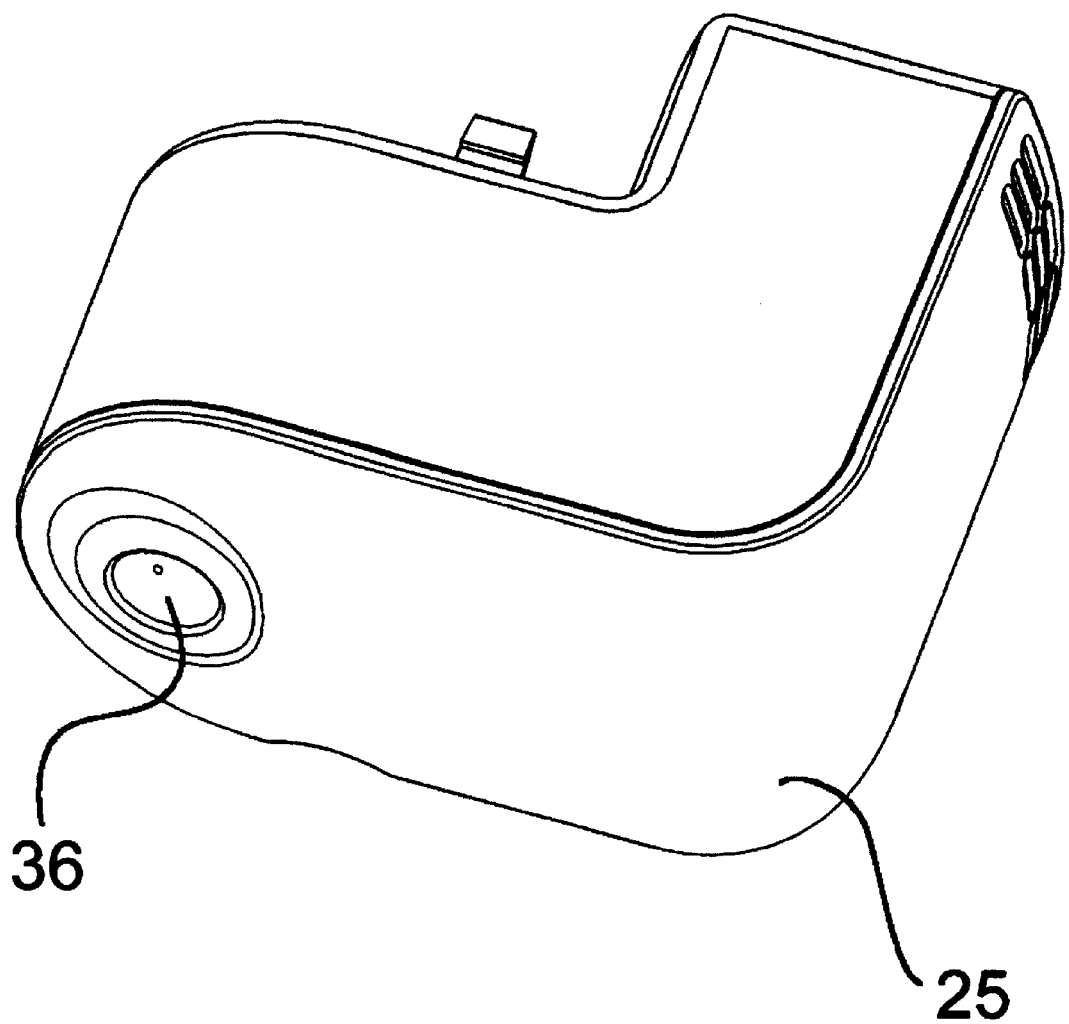
FIG. 8 illustrates a drive motor for the frozen confectionery maker.

Referring to FIG. 8, a motor pack 25 is provided for rotating the mixer 20. The motor pack 25 is received within the recessed portion 28 of top cover 14. A drive coupling (not shown) engages with the spline 22 in known manner. An electric cord with plug (not shown) provides power for motor pack 25. A switch 36 is provided on the top of motor pack 25 for on/off operation. The motor pack 25 only drives in one direction, which need not be changed.

The motor pack 25 optionally has a timer and alarm for recording and indicating when the frozen confectionary is ready and the dispensing operation should begin.

Figure 9:
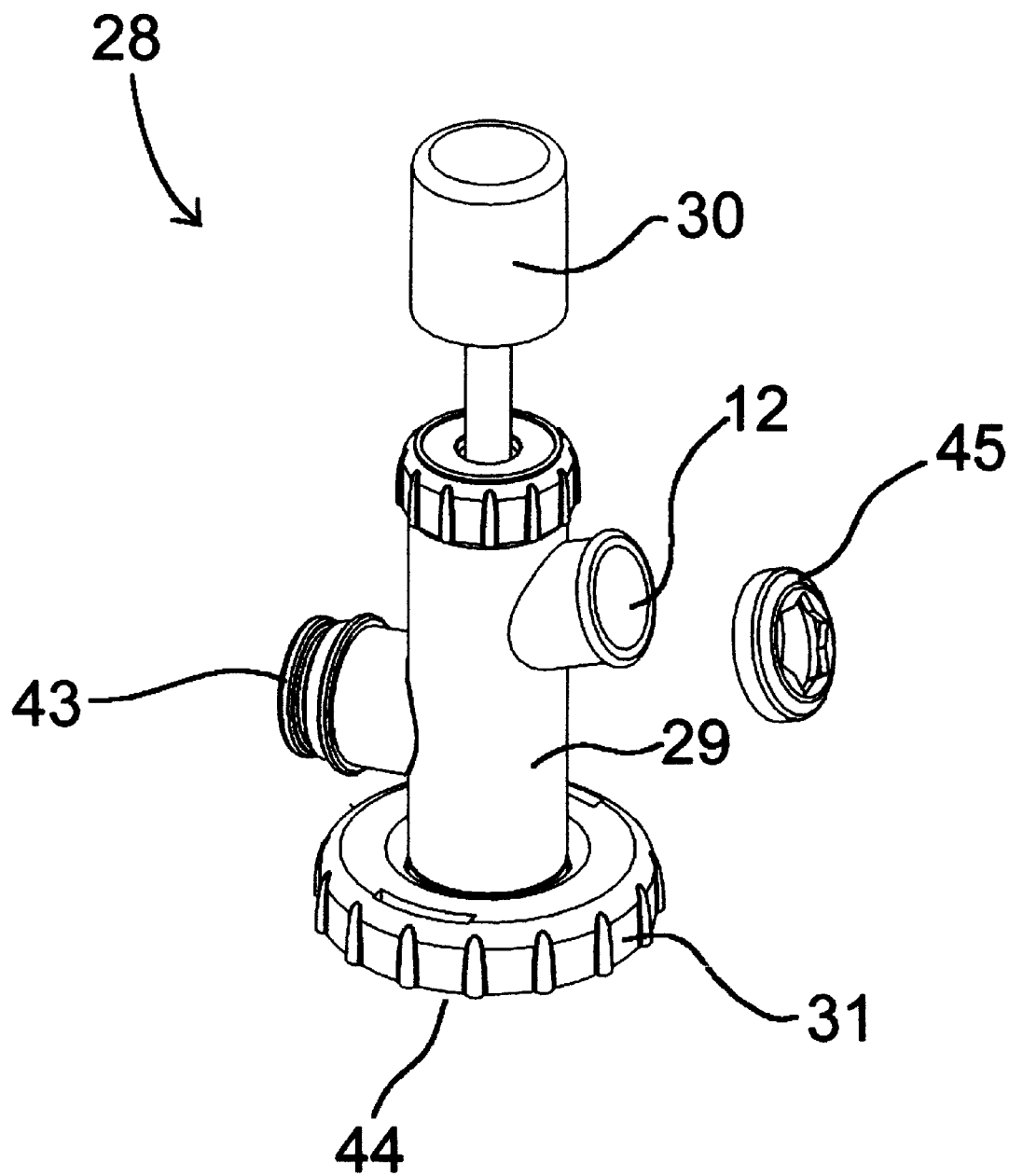
FIG. 9 illustrates a valve assembly for the confectionery maker.
Figure 10:
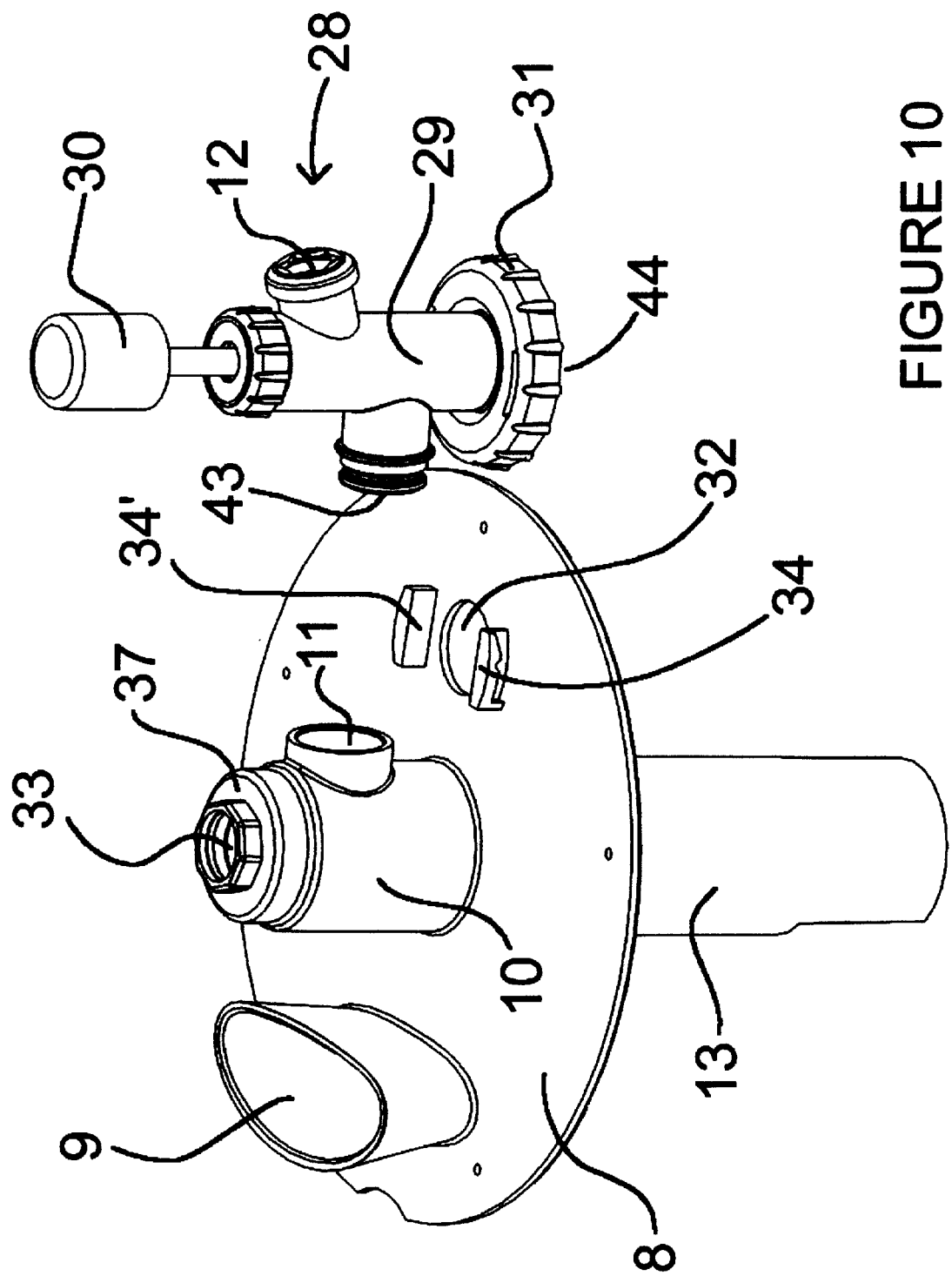
FIG. 10 illustrates assembly of the valve and lid.

Referring to FIGS. 9 and 10, a three-way valve assembly 28 is provided for controlling the dispensing of prepared frozen confectionery mixture. The valve assembly 28 comprises a valve body member 29, which provides a fluid passage for the flow of frozen confectionery. The valve body has an inlet opening for fluidly communicating with opening 11 of housing 10. Two outlet openings are provided in body 29. The first outlet is a return opening 44 for fluidly communicating with return opening 32 in lid 7. The second outlet opening is dispensing spout 12.

A valve stem having a valve seat (not shown) at its first end and a handle member 30 at its second end is received within body 29 for controlling fluid flow. The valve seat has a first position directing the path of the fluid passage from the inlet opening 43 to the return opening 44 and a second position directing the path of the fluid passage from the inlet opening 43 to the dispensing tube 12.

A retaining ring 31 is provided on the lower portion of body 29 for removably securing the valve to lid 7. Securing ring 31 engages with securing tabs 34.

A die ring 45 can be placed on dispensing tube 12 to add shapes or patterns to the dispensed frozen confectionery.

Figure 11:
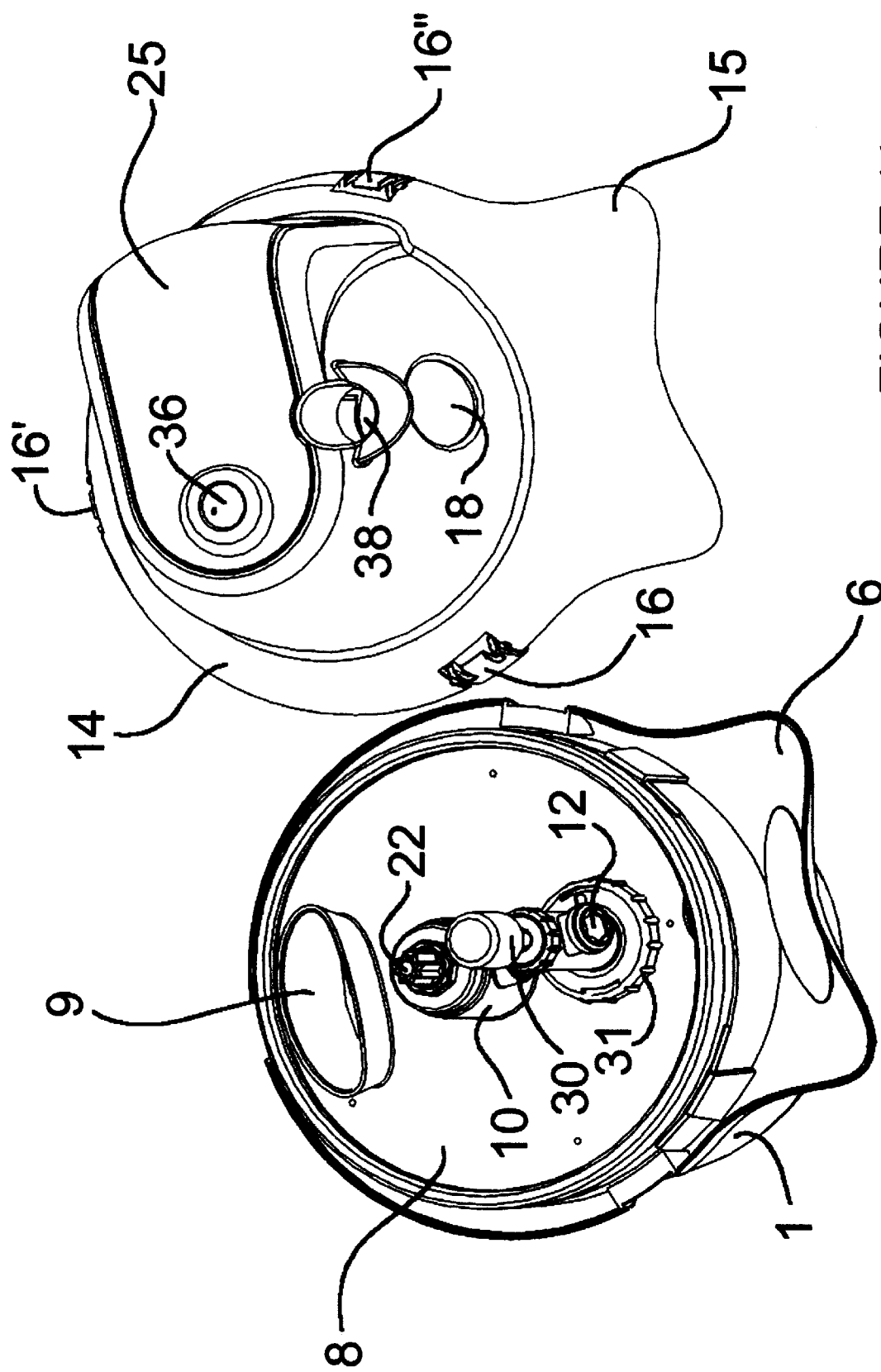
FIG. 11 illustrates final assembly of the frozen confectionery maker.

Referring to FIG. 11, when the lid 7, mixer 20 and valve assembly 28 are assembled the top cover 14 is located in place and the securing latched 16 secured. Valve handle 30 extends through opening 28 in top cover 14 so that the valve position can be changed.

Container 1 and top cover 14 have corresponding collar portions 6 and 15 respectively that are disposed in juxtaposition when the confectionary maker is assembled. The collars 6, 15 provide a foot to support the top end of the confectionary maker so that it can disposed in an inclined orientation on a flat firm surface Operation of the frozen confectionary maker will now be described. The container 1 is assembled with a suitable freezable solution within its wall and base cavities. The solution should be at a temperature of −20° C. The remainder of the apparatus is assembled as described above, and placed in an inclined position on a firm surface.

A suitable ice cream/confectionery mixture is prepared and pre-cooled in known manner. The motor pack 25 is first started, and then the cooled mixture is introduced into container 1 through aperture 19. The valve is in the first position to direct the fluid passage to the return opening. This is the mix position. Typically, it might take about 30 minutes, more or less, for the confectionery to become ready to dispense. During this time the paddles and dasher scrap mixture from the walls of the container and mix it while at the same time aerating it. This aeration causes the mixture to increase in volume up to 35%. The viscosity of the mixtures increases as its temperature falls.

During the mixing operation confectionery mixture from around the lower portion of container 1 is scooped by paddles 23 towards the second end of screw 21. Screw 21 urges the confectionery mixture up screw tube 13. The confectionery mixture is urged into the fluid passage in valve assembly 28 but returns to the mixing container via the return opening 32.

When the frozen confectionery is ready to serve the valve assembly is moved to the second position. This is the dispense position. The motor continues to operate in the same direction. As with the mix position, confectionery mixture is urged up screw tube 13 by screw 21 and into the fluid passage. With the valve in the second position the confectionary mixture can only proceed to the dispensing tube 12. The motor is left running until there is no mixture available internally to be dispensed.

When all of the mixture is dispensed the motor is turned off. The machine can be disassembled and washed ready for the next operation.

The invention provides a frozen confectionary maker that can remain in a fixed position on a flat surface during both mix and dispense operations. The motor need only rotate in one direction.

Where in the foregoing description reference has been made to integers or elements have known equivalents then such are included as if individually set forth herein.

Embodiments of the invention have been described, however it is understood that variations, improvement or modifications can take place without departure from the spirit of the invention or scope of the appended claims.

What is claimed is:

1. A frozen confectionery maker including:
   a mixing container having a cavity in its walls and base for receiving freezable solution;
   a lid for closing the container;
   a mixer assembly in the container;
   a drive means to rotate the mixer;
   a fluid passage in juxtaposition the lid, the fluid passage having at least a first opening proximate the mixer and a second opening at a spout external the lid; and
   a valve located within the fluid passage and having an operable position to close the passage;
   the mixer assembly including a first elongate screw portion adapted to deliver confectionery mixture in the container to the fluid passage via the first opening, and a second paddle portion disposed proximate a second end of the screw portion, the paddle portion adapted to direct confectionery mixture towards the screw portion, the mixture returning to the container if the valve is in the operable position, or passing through the passage to the spout if the valve is not in the operable position.

2. A frozen confectionery maker as claimed in claim 1 wherein the lid has a skirt extending to provide a tube in which the mixer screw portion is received, the passage first opening located within the skirt.

3. A frozen confectionery maker as claimed in claim 1 wherein the mixer further includes an aerator portion extending helically from the paddle portion toward the lid.

4. A frozen confectionery maker as claimed in claim 3 wherein the aerator portion is adapted to scrape the inner walls of the container.

5. A frozen confectionery maker as claimed in claim 1 wherein the fluid passage has a return opening wherein if the valve is in the operable position confectionery mixture is discharged from the return opening and if the valve is not in the operative position confectionery mixture is discharged from the spout.

6. A frozen confectionery maker including:
   first and second container portions arranged to provide a container having a cavity in its walls and base for receiving freezable solution;
   a lid for closing the container;
   a mixer rotatably engageable with the lid so as to locate within the container;
   a drive means receivable on the lid so as to engage and rotate the mixer;
   a fluid passage in juxtaposition the lid, the fluid passage having at least a first opening proximate the mixer and a second opening at a spout external the lid; and
   a valve located within the fluid passage and having an operable position to close the passage;

the mixer assembly including a first elongate screw portion having a first end adapted to rotatable engage the lid, the screw portion adapted to deliver confectionery mixture in the container to the passage via the first opening, a second paddle portion pivotally disposed proximate a second end the screw portion, the paddle portion adapted to direct confectionery mixture towards the screw portion, the mixture returning to the container if the valve is in the operable position, or passing through the passage to the spout if the valve is not in the operative position.

7. A frozen confectionery maker as claimed in claim 6 wherein the mixer further includes an aerator portion adapted to scrape the inner walls of the container.

* * * * *